(12) United States Patent
Lee et al.

(10) Patent No.: US 7,133,552 B2
(45) Date of Patent: Nov. 7, 2006

(54) METHOD OF EXTRACTING FACE USING COLOR DISTORTION INFORMATION

(75) Inventors: Jin Soo Lee, Seoul (KR); Heon Jun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 810 days.

(21) Appl. No.: 09/982,258

(22) Filed: Oct. 19, 2001

(65) Prior Publication Data

US 2002/0048399 A1 Apr. 25, 2002

(30) Foreign Application Priority Data

Oct. 20, 2000 (KR) ............................... 2000-61876

(51) Int. Cl.
*G06K 9/00* (2006.01)
(52) U.S. Cl. ..................... 382/164; 382/165
(58) Field of Classification Search ................ 382/118, 382/125, 162–167, 171–173, 179, 190, 198; 358/453, 500, 515, 517, 518, 527, 538; 514/2, 514/8, 12, 21; 530/300, 350, 356
See application file for complete search history.

(56) References Cited

U.S. PATENT DOCUMENTS

| 5,296,945 | A | * | 3/1994 | Nishikawa et al. | .......... 358/518 |
| 5,850,463 | A | * | 12/1998 | Horii | .......................... 382/118 |
| 6,188,777 | B1 | * | 2/2001 | Darrell et al. | .............. 382/103 |
| 6,320,668 | B1 | * | 11/2001 | Kim | .......................... 358/1.1 |
| 6,445,819 | B1 | * | 9/2002 | Kinjo | ......................... 382/173 |

* cited by examiner

*Primary Examiner*—Jingge Wu
*Assistant Examiner*—Abolfazl Tabatabai
(74) *Attorney, Agent, or Firm*—Fleshner & Kim, LLP (57) ABSTRACT

Disclosed is a face extraction method using color distortion information. The face extraction method includes extracting color distortion information from the given image, determining a skin color range in a color space using the extracted color distortion information, and performing the face extraction by extracting the skin color region using the determined skin color range. According to the method, the face is more accurately extracted by extracting the color distortion information of a still image or moving image when the image is given, and variably and automatically determining the skin color range suitable for the given image using the color distortion information.

13 Claims, 6 Drawing Sheets

METHOD OF EXTRACTING FACE USING COLOR DISTORTION INFORMATION

BACKGROUND OF THE INVENTION

1. Field of the Invention

The present invention relates generally to a face extraction from a moving picture or still image, and more particularly to an effective method for extracting the face using color distortion information.

2. Description of the Related Art

In various applications that use a digital moving picture or still image, such as a video indexing for providing a function of multimedia search, a human face is extracted and used in those applications.

As related arts, the conventional methods of extracting the face are as follows.

1. "Automatic Extraction of Face from Color Reversal Film Using Statistical Multi-step Filtering Technique" ACCV'95 Second Asian Conference On Computer Vision. December 5–8

2. FaceIt (Visionics Corporation)

The technique of the first conventional methods relates to a method of searching a human face in a still image. According to this technique, an RGB color space is converted into an HSV color space, and then only pixels corresponding to a predefined skin color region are extracted.

The extracted skin color region is segmented after performing a post-processing such as an edge detection, a hole filling, or a gap filling operation, etc.

The segmented region is used for confirming the human face using a pattern prepared in advance for evaluation.

The second conventional technique is a tool kit having a function of automatically extracting the human face if the human moves on a camera screen and confirming whether he/she is a registered person and who he/she is.

The face extraction algorithm in this tool kit uses a method using a movement of an object and a neural network.

According to the second conventional technique, any color is not used, and thus any skin color information is not used.

However, most of face extraction algorithms such as the first conventional technique use the skin color information, and in actual applications, a range of the skin color is very broad in dependent of a medium of an image, environment, and illumination.

Accordingly, in a specified experimental environment, the skin color region can be determined and applied. However, in order to apply it to diverse moving picture media, a very broad region of the skin color should be determined, and thus certain region that is not the face may be extracted as the skin color region under certain circumstances.

However, since the skin color range of the face appearing in the same moving picture program or an image is not broad, the skin color region can be accurately extracted if a proper range can be determined. This is because the skin color region in the same images or moving pictures appears relatively regularly, since those images or moving pictures are photographed by the same medium and under the same environment.

However, when a certain still image or moving picture is given, a proper range of the skin color to match the given image among the entire skin color region cannot be automatically determined, and thus the above-described characteristic cannot be utilized.

SUMMARY OF THE INVENTION

Accordingly, the present invention is directed to a face extraction method that substantially obviates one or more of the problems due to limitations and disadvantages of the related art.

An object of the invention is to provide an effective method for extracting a face more accurately, by extracting color distortion information of a still image or moving image, and variably and automatically determining a skin color range suitable for the given image, using the extracted color distortion information.

To achieve these and other advantages, and in accordance with the purpose of the present invention as embodied and broadly described, the present invention provides a method for extracting a face from a still image or moving image using color distortion information, the method comprising the steps of:

extracting the color distortion information from the given image;

determining a skin color range in a color space using the extracted color distortion information; and extracting the face by extracting a skin color region using the determined skin color range.

The color distortion information according to an embodiment of the present invention is hue information.

In the embodiment of the present invention, the step of extracting the color distortion information comprises steps of: dividing the image into N*M partial regions; obtaining an average hue value of pixels having a chroma above a predetermined threshold, and a variance of hue values for the pixels concerned in the average hue value with respect to all the divided regions; re-averaging the average hue values with respect to the regions satisfying a condition that the variance is below a predetermined threshold value, and obtaining a variance of the average hue values concerned in the re-averaging; and designating the re-averaged average hue value as the hue value of the color distortion information.

In the embodiment of the present invention, the step of determining the skin color range in the color space using the extracted color distortion information comprises the steps of: predetermining entire skin color range in a specified color space; determining partial skin color ranges to be applied in a certain given image within the predetermined entire skin color range; comparing the hue of the extracted color distortion information with representative hues of the partial skin color ranges; and determining a partial skin color range of which its representative hue is closest to the hue of the color distortion information as a skin color range of the given image.

The representative hue of the partial skin color range may be the average hue of the pixels in the color space that belongs to the partial skin color range.

In the embodiment of the present invention, the step of determining the skin color range in the color space using the extracted color distortion information comprises the steps of: predetermining entire skin color range in the specified color space; determining partial skin color ranges in the entire skin color range based upon the hue of the color distortion information; and determining the partial skin color range corresponding to the hue of the extracted color distortion information as the skin color range of the given image.

The color distortion information extracted by the above process may be luminance information. In case that the luminance information is used as the color distortion information, the color distortion information is extracted based upon an average luminance of the pixels having the chroma below a predetermined threshold value.

In the embodiment of the present invention, the step of determining the skin color range in the color space using the luminance information extracted as the color distortion information comprises the steps of: predetermining the entire skin color range in the specified color space; determining partial skin color ranges in the entire skin color range based upon the luminance information of the color distortion information; and determining a partial skin color range corresponding to the luminance of the extracted color distortion information as the skin color range of the given image.

According to the present invention, when the still image or moving image is given, the range of the skin color region suitable for the given image is variably and automatically determined by analyzing the given image, and thus the face can be extracted more accurately.

At this time, the analysis of the given image is performed by obtaining the color distortion information. The color distortion information means an element that affects the entire color of the image according to an illumination or an image retrieval system. For example, in case of the image distorted by a red-tone illumination or camera filter, it has a characteristic that the hue of the entire image is represented much reddish than its original color.

The present invention extract the color distortion information and determines a partial skin color region suitable for the given image among the possible skin color regions of the entire image.

At this time, it can be considered that the determined partial skin color region is the optimum skin color range that can extract only the skin color from the given image, and thus the face can be extracted more accurately.

Additional advantages, objects, and features of the invention will be set forth in part in the description which follows and in part will be apparent to those having ordinary skill in the art upon examination of the following or may be learned from practice of the invention. The objectives and other advantages of the invention may be realized and attained as particularly pointed out in the appended claims.

BRIEF DESCRIPTION OF THE DRAWINGS

The present invention will be described in detail with reference to the following drawings in which like reference numerals refer to like elements wherein.

DETAILED DESCRIPTION OF THE PREFERRED EMBODIMENTS

Hereinafter, a method for extracting a face using color distortion information according to the present invention will be described in detail with reference to preferred embodiments illustrated in the attached drawings.

Figure 1:
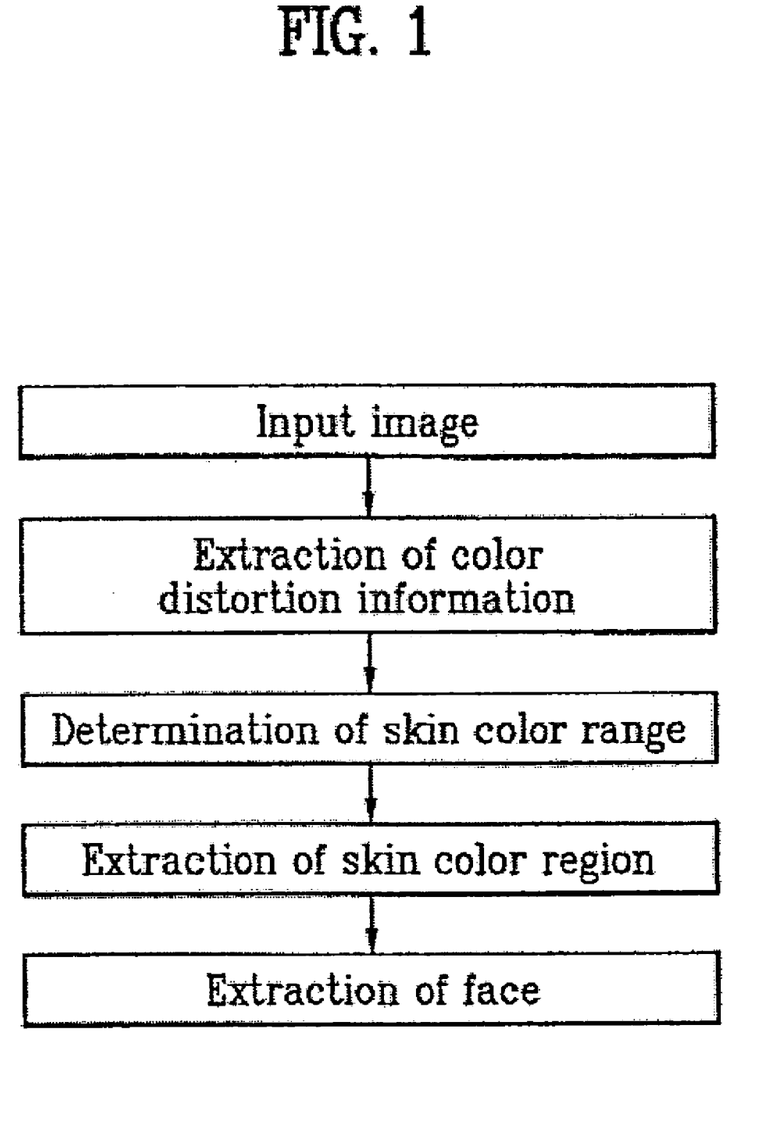
FIG. 1 is a flowchart illustrating the face extraction method using color distortion information according to the present invention.

The face extraction method according to the present invention extracts the face by performing the process of FIG. 1.

First, when an image or moving picture is inputted, color distortion information is extracted from the given image or picture that a user wants to extract the face.

Once the color distortion information is extracted, a skin color range is determined in the given image, and a skin color region is extracted using the determined skin color range.

Thereafter, the face is finally extracted using various face extraction methods applying the skin color region. According to the present invention, those methods are diversely implemented without limiting the scope of the present invention.

As described above, overall face extraction process was explained. Key processes of the face extraction according to the present invention are the extraction of color distortion information and determination of the skin color range. Those key processes will now be explained in more detail.

[Extraction of Color Distortion Information]

The color distortion may be occurred for the following reasons.

(a) Distortion by an illumination: This is the color distortion which is due to the illumination having a specified luminance and color. Either only a portion of the image can be distorted or the entire image can be distorted.

(b) Distortion by device characteristics: This is the distortion which is due to the characteristics of an image retrieval means such as a digital camera. In this case, the entire image is distorted.

For example, even if two images have the same scenes, different colors of a blue tone or red tone may appear in with the images, depending on the digital camera used for photographing.

(C) Distortion by characteristics of an encoder: Even if the same image retrieval means is used for two images or a distortion-free image retrieval means is used, the color may be distorted owing to algorithm characteristics of the encoder for storing the retrieved image as a file. In this case, most of distortion characteristics are the same as those of distortion by the device characteristics.

(d) Distortion by a color filter: Since the image retrieval means such as the digital camera uses a color filter, the color may be distorted. The color filter may be either a function of the camera itself or a function that can be added by the user's preference.

The color distortion may be occurred because of the reasons as described in the above paragraphs (a) to (d), and a partial distortion by the illumination is considered to be difficult to be compensated for.

In this case, however, since the entire region is not distorted by the illumination, deterioration of search performance by the distortion is not larger than deterioration by other kinds of distortion.

If the entire image is distorted by other reasons, a similar distortion pattern is shown over the entire image. Using this characteristic, the distortion information can be extracted. In other words, it is possible to get some information on how much the image is distorted by which color component.

The color distortion information as described above can be extracted by the process of FIG. 2.

Figure 2:
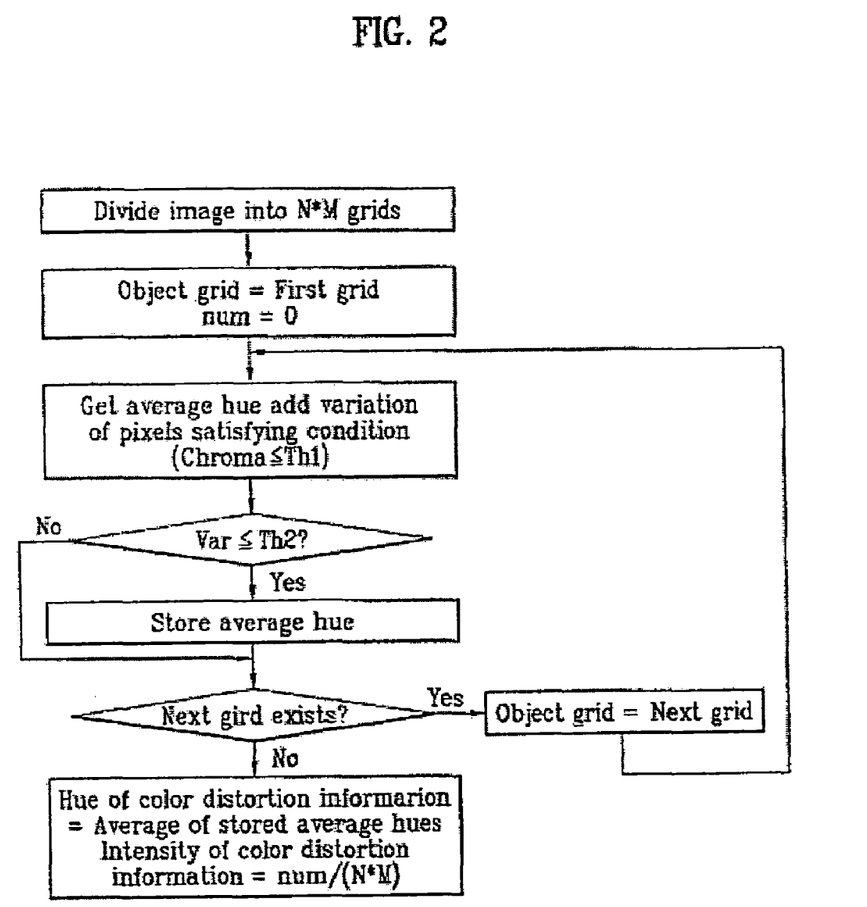
FIG. 2 is a flowchart illustrating the process of extracting color distortion information extracted as hue information according to the present invention.

Referring to FIG. 2, first of all the image is divided into N*M partial regions. Then, an average hue value of pixels having a chroma below a predetermined threshold value Th1 and a variance Var of hue values of the pixels concerned in the average hue value are obtained with respect to all the divided regions.

With respect to the regions satisfying a condition that the variance Var is below a predetermined threshold value Th2, the average hue values obtained in the respective regions are re-averaged and a variance of the average hue values concerned in the re-averaging is obtained.

A ratio "num/(N*M)" of the regions, which satisfying a condition that the variance concerned in re-averaging of the hue value is below the predetermined threshold value, to the entire image is designated as the intensity (i.e., degree of distortion) of color distortion. And, then the re-averaged average hue value is designated as the hue value of the color distortion information.

Figure 3:
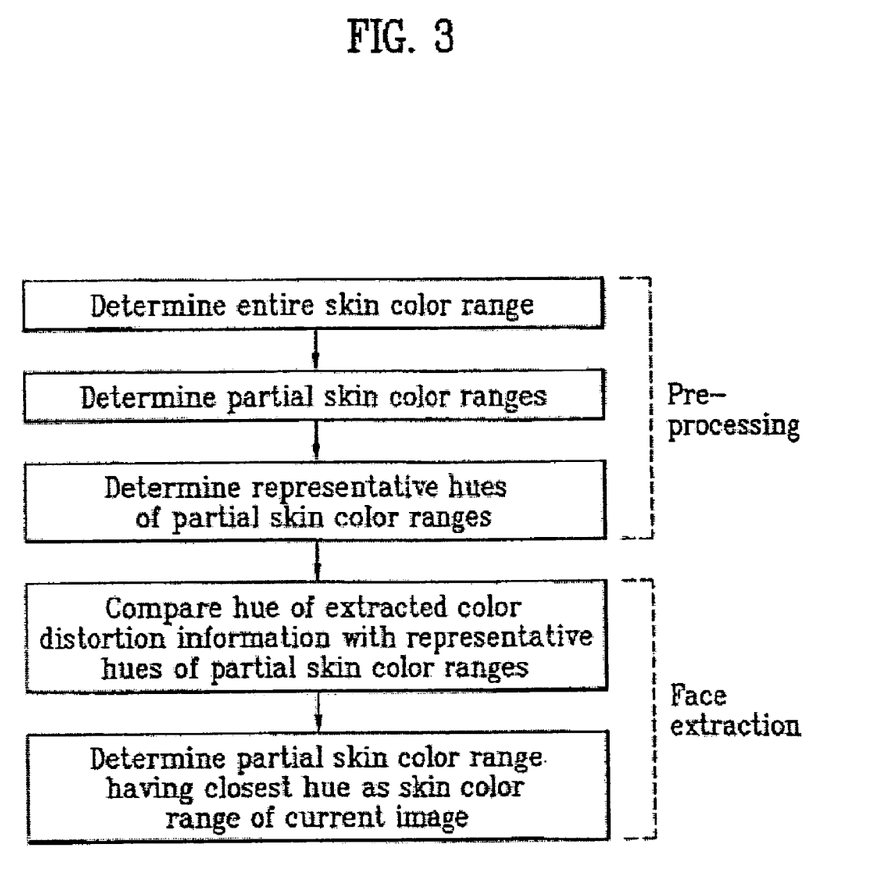
FIG. 3 is a flowchart illustrating the process of extracting the skin color region using the color distortion information according to an embodiment of the present invention.

Through the above-described method, the hue value of the color distortion information can be obtained, and at this time, the intensity can be also extracted.

in FIG. 3, the method of extracting the skin color region using the extracted color distortion information is shown.

Figure 4:
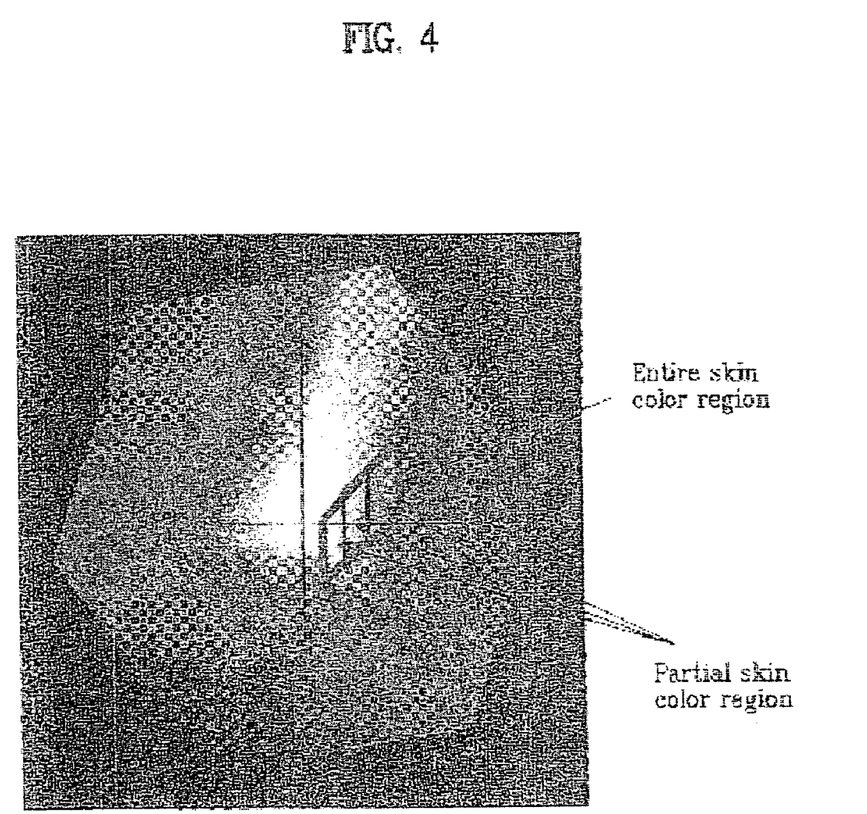
FIG. 4 is a view illustrating entire skin color range and partial skin color ranges in a specified color space according to the present invention.

First, the entire skin color range in the specified color space is determined in advance, and partial skin color ranges to be applied in the given image is determined within the entire skin color range as shown in FIG. 4.

At this time, the entire skin color range and the partial skin color ranges are determined by an experiment.

The hue value included in the color distortion information extracted from the given image is compared with representative hue values of the divided partial skin color ranges. As a result of the comparison, the partial skin color range that its representative hue values are closest to the hue of the color distortion information is determined as the partial skin color range of the given image.

At this time, the representative hue value of the partial skin color range may be the average hue value of the pixels in the color space that belongs to the partial skin color range.

Figure 5:
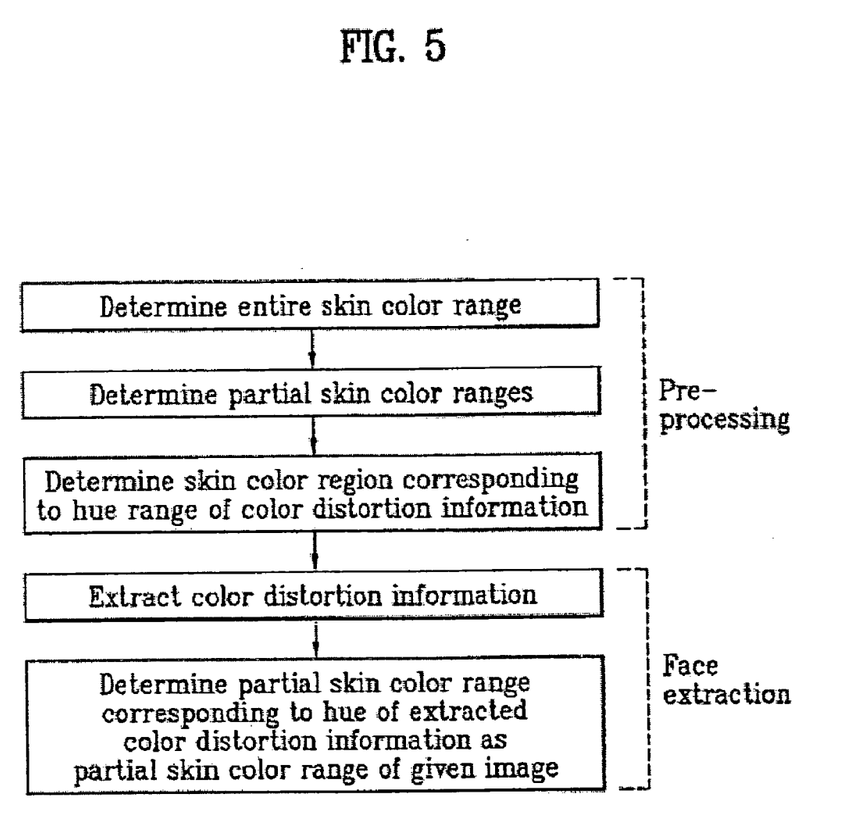
FIG. 5 is a flowchart illustrating the process of extracting the skin color region using the color distortion information according to another embodiment of the present invention.

Meanwhile, FIG. 5 is a flowchart illustrating another embodiment of extracting the skin color region using the color distortion information according to the present invention.

First, the entire skin color range in the specified color space is determined in advance.

The partial skin color ranges are determined in advance in the entire skin color range based on the hue of the color distortion information.

At this time, when hue of the color distortion information is within a specified range, the partial skin color ranges are determined by designating a partial skin color range corresponding to the specified range.

If the color distortion information is extracted as described above, the corresponding partial skin color region is determined using the hue information of the extracted color distortion information.

[Another Embodiment of Extraction of Color Distortion Information]

The face can be also extracted by extracting luminance information as the color distortion information and determining the skin color region.

In case that the color distortion information is the luminance information, the color distortion information is extracted as an average luminance of the pixels having the chroma below a predetermined threshold value. The skin color range in the color space can be determined using the color distortion information.

Specifically, the entire skin color range in the specified color space is determined in advance.

Then, the partial skin color ranges in the entire skin color range are determined according to the luminance information of the color distortion information extracted as above.

Thereafter, the partial skin color range corresponding to the luminance of the extracted color distortion information is determined as the skin color range of the given image.

As described above, the face is finally extracted by applying the skin color region determined by the color distortion information. The present invention is not limited to those explained as above.

[Another Embodiment of the Present Invention]

Meanwhile, a method of extracting a face using color distortion information according to another embodiment of the present invention comprises the steps of:

extracting color distortion information with respect to either of two frames when two frames are inputted for a predetermined time;

determining a skin color range in a color space using the extracted color distortion information;

extracting a skin color region using the determined skin color range;

extracting a difference image between the two input frames;

obtaining a region which has a skin color and in which a motion is occurred by logically multiplying the extracted difference image and the skin color region;

designating the region satisfying a face ratio among the obtained regions as a candidate of the face; and determining the face by a template matching of the face candidate.

Figure 6:
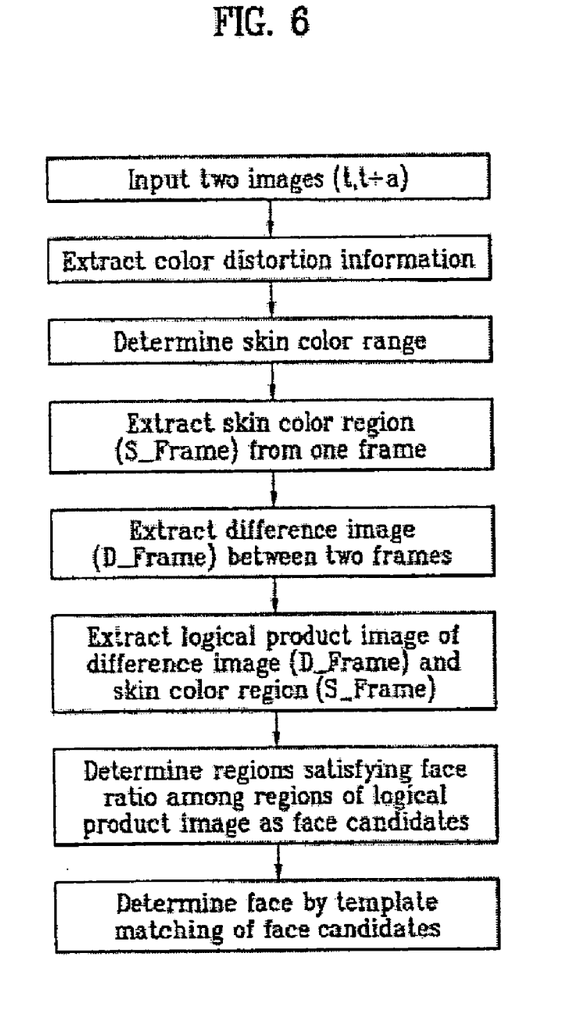
FIG. 6 is a flowchart illustrating the face extraction method using color distortion information according to another embodiment of the present invention.

According to another embodiment of the present invention, the face is extracted using both the color distortion information and motion information, and thus more accurate face detection can be achieved. FIG. 6 is a flowchart illustrating the face extraction method using both color distortion information and motion information according to another embodiment of the present invention.

Referring to FIG. 6, when a frame at a predetermined time t and a delayed frame at a time t+a are inputted, the color distortion information is extracted from the delayed frame inputted at the time t+a. The skin color region (S_frame) is extracted by designating the skin color range using the extracted color distortion information.

Then, a difference image (D_frame) between the input frame at the time t and the delayede frame at the time t+a is obtained to get a region that a motion is occurred.

Thereafter, by logically multiplying the extracted difference image (D_frame) and the obtained skin color region (S_frame), it is possible to get a region that has a skin color and also the motion is occurred.

Specifically, it is possible to get a combined image, wherein some pixels of the image having both the skin color and the motion difference are set to '1', and other pixels are set to '0'.

considering a group having the pixels set to '1' as a region, a region satisfying a face ratio among the obtained regions is designated as a candidate of the face, and then the face extraction is finally completed by identifying the face candidate by a predetermined template.

In the embodiment of the present invention, the skin color region is extracted from the input frame at the time t+a, but it is also possible to extract the skin color region from the input frame at the time t.

Here, considering that images of 30 frames per second are inputted, the reference times t and t+a for selecting the input frames can be adaptively determined by 15 frames or 30 frames.

As described above, the present invention has the advantages that it can extract the face more accurately by analyzing the skin color range of diverse image media using the color distortion information and determining the limited skin color range suitable for the given image using the color distortion information.

Also, in case of moving images, more accurate face extraction is possible because the motion information is used, in addition to the color distortion information.

The face extraction can be used as the core technique in the diverse fields where the digital moving images are mainly used, such as the video indexing.

Although the foregoing preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for extracting a face from a still image or moving image using color distortion information, the method comprising:

extracting color distortion information from a given image;

determining a skin color range in a color space using the extracted color distortion information; and extracting a face by extracting a skin color region using the determined skin color range, wherein the color distortion information is hue information, and wherein extractintg the color distortion information comprises:

dividing an image into N*M partial regions:

obtaining an average hue value of pixels having a chroma above a predetermined threshold, and a variance of hue values for the pixels concerned in the average hue value with respect to all the divided regions;

re-averaging average hue values obtained in the respective regions with respect to regions satisfying a condition that the variance is below a predetermined threshold, and obtaining a variance of the average hue values concerned in the re-averaging; and designating the re-averaged average hue value as the hue value of the color distortion information.

2. The method as claimed in claim 1, wherein determining the skin color range in the color space using the extracted color distortion information comprises:

predetermining entire skin color range in the specified color space;

determining partial skin color ranges to be applied in a certain given image within the predetermined entire skin color range;

comparing the hue of the extracted color distortion information with representative hues of the partial skin color ranges; and determining a partial skin color range that its representative hue is closest to the hue of the color distortion information as a skin color range of the given image.

3. The method as claimed in claim 2, wherein the representative hue of the partial skin color range is the average hue of the pixels that belongs to the partial skin color range.

4. The method as claimed in claim 1, wherein determining the skin color range in the color space using the extracted color distortion information comprises:

predetermining the entire skin color range in the specified color space;

determining partial skin color ranges in the entire skin color range, based on the hue of the color distortion information; and determining the partial skin color range corresponding to the hue of the extracted color distortion information as the skin color range of the given image.

5. A face extraction method using color distortion information, comprising:

extracting the color distortion information with respect to either of two frames when the two frames are inputted for a predetermined time;

determining a skin color range in a color space using the extracted color distortion information;

extracting a skin color region using the determined skin color range;

extracting a difference image between the two input frames;

obtaining a region that has a skin color and a motion is produced by logically multiplying the extracted difference image and the skin color region;

designating a region satisfying a face ratio among the obtained regions as a candidate of the face; and identifying the candidate of the face by a template matching.

6. The method as claimed in claim 5, wherein the color distortion information is hue information.

7. The method as claimed in claim 6, wherein extracting the color distortion information comprises:

dividing an image into N*M partial regions;

obtaining an average hue value of pixels having a chroma above a predetermined threshold, and a variance of hue values for the pixels concerned in the average hue value with respect to all the divided regions;

re-averaging average hue values obtained in the respective regions with respect to regions satisfying a condition that the variance is below a predetermined threshold, and obtaining a variance of the average hue values concerned in the re-averaging; and designating the re-averaged average hue value as the hue value of the color distortion information.

8. The method as claimed in claim 6, wherein determining the skin color range in the color space using the extracted color distortion information comprises:

predetermining entire skin color range in the specified color space;

determining partial skin color ranges to be applied in a certain given image within the predetermined entire skin color range;

comparing the hue of the extracted color distortion information with representative hues of the partial skin color ranges; and determining a partial skin color range that its representative hue is closest to the hue of the color distortion information as a skin color range of the given image.

9. The method as claimed in claim 8, wherein the representative hue of the partial skin color range is the average hue of the pixels that belongs to the partial skin color range.

10. The method as claimed in claim 6, wherein determining the skin color range in the color space using the extracted color distortion information comprises:

predetermining the entire skin color range in the specified color space;

determining partial skin color ranges in the entire skin color range, based on the hue of the color distortion information; and determining the partial skin color range corresponding to the hue of the extracted color distortion information as the skin color range of the given image.

11. The method as claimed in claim 5, wherein the color distortion information extracted by the above process is luminance information.

12. The method as claimed in claim 11, wherein the color distortion information is extracted based upon an average luminance of the pixels having a chroma below a predetermined threshold value.

13. The method as claimed in claim 11, wherein determining the skin color range in the color space using the color distortion information extracted as the luminance information comprises:

predetermining the entire skin color range in the specified color space;

determining partial skin color ranges in the entire skin color range, based upon the luminance information of the color distortion information; and determining a partial skin color range corresponding to the luminance of the extracted color distortion information as the skin color range of the given image.

* * * * *